United States Patent
Crabtree

[11] 3,905,950
[45] Sept. 16, 1975

[54] REACTIVE DISAZO DYESTUFFS CONTAINING 1-AMINOALKYL-6-HYDROXYPYRID-6-ONE AND MONOCHLOROTRIAZINYL GROUPINGS

[75] Inventor: Allen Crabtree, Manchester, England

[73] Assignee: Imperial Chemical Industries Limited, London, England

[22] Filed: June 4, 1973

[21] Appl. No.: 366,686

Related U.S. Application Data
[63] Continuation-in-part of Ser. No. 160,560, July 7, 1971, abandoned, which is a continuation-in-part of Ser. No. 860,030, Sept. 22, 1968, abandoned.

[30] Foreign Application Priority Data
Dec. 9, 1968    United Kingdom............... 58281/68

[52] U.S. Cl.......... 260/153; 260/296 R; 260/507 R; 260/508
[51] Int. Cl.²... C09B 62/08; D06P 1/38; D06P 3/60
[58] Field of Search............... 260/153, 156, 146 T

[56] References Cited
UNITED STATES PATENTS

| | | | |
|---|---|---|---|
| 2,431,190 | 11/1947 | Morgan.......................... | 260/156 X |
| 3,149,100 | 9/1964 | Hindermann et al............... | 260/153 |
| 3,226,176 | 12/1965 | Hindermann et al........... | 260/153 X |
| 3,362,948 | 1/1968 | Andrew et al.................... | 260/146 T |
| 3,487,066 | 12/1969 | Ritter et al......................... | 260/156 |
| 3,639,662 | 2/1972 | Griffiths.......................... | 260/146 T |
| 3,664,995 | 5/1972 | Andrew et al.................... | 260/146 T |
| 3,725,383 | 4/1973 | Austin et al..................... | 260/146 T |
| 3,729,476 | 4/1973 | Austin et al..................... | 260/156 X |

*Primary Examiner*—Floyd D. Higel
*Attorney, Agent, or Firm*—Cushman, Darby & Cushman

[57] ABSTRACT

Disazo dyestuffs of the formula:

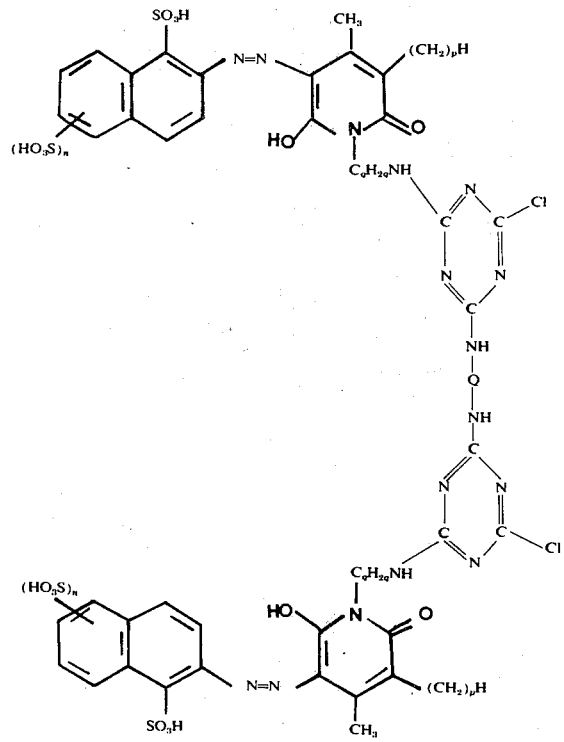

wherein
$n$ is 0, 1 or 2
$p$ is 0, 1 or 2
$q$ is 2 or 3 and
$Q$ is a member of the group consisting of 4,6-disulpho-1,3-phenylene, 2,5-disulpho-1,4-phenylene,

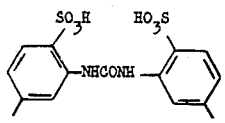 and 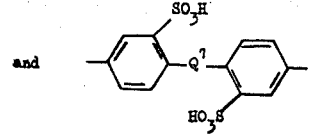

(2) (3)

in which $Q^1$ is a direct link or —CH=CH—, —NH—CONH—, —S—, —OCH$_2$CH$_2$O—, —CH$_2$— or —CH$_2$CH$_2$—.

These dyestuffs are greenish-yellow cellulose-reactive dyes of good fastness to washing, light, hypochlorite bleaching and to acid and alkali treatments. Mixtures with phthalocyanine dyes exhibit better resistance to catalytic wet fading than similar dyes based on pyrazolone coupling components.

6 Claims, No Drawings

REACTIVE DISAZO DYESTUFFS CONTAINING 1-AMINOALKYL-6-HYDROXYPYRID-6-ONE AND MONOCHLOROTRIAZINYL GROUPINGS

This application is a continuation-in-part of application Ser. No. 160,560 filed July 7, 1971, now abandoned, which itself was a continuation-in-part of application Ser. No. 860,030, filed Sept. 22, 1968 and now abandoned.

This invention relates to new disazo dyestuffs of the hydroxypyridone series, and is more particularly concerned with the provision of a range of disazo cellulose reactive dyes which are primarily intended to be dyed from hot, alkaline saline dyebaths to provide very bright greenish-yellow shades on cotton, viscose rayon and other cellulose materials such as linen. These new dyestuffs are strong tinctorially, and provide shades on these materials which have an adequate light fastness, very good fastness to washing and to bleach treatments, to acid and alkali treatments.

STATE OF THE ART

This invention is a development arising from the general class of reactive dyestuffs described in U.K. Patent Specification No. 854,432 which consist, broadly of two similar monoazo dye radicals linked through two monochloro-s-triazine residues themselves connected by a diamine residue. This broad class has proved a useful source of dyes which dye cellulose from hot alkaline saline dyebaths, although to obtain commercially useful dyes it is necessary to carefully balance the effect of the monoazo dye residue with the effect of the diamine residue.

Some improved dyes of this type are described, for example in U.S. Pat. Nos. 3,639,662 and 3,658,782 in which the essentially novel concept lies in the use of certain diamines used as the linking group. In these specifications greenish-yellow shades are obtained by linking together monoazo dyes of the phenylazopyrazolone series by chloro-s-triazine groups and the appropriate diamine.

However these dyes have certain deficiencies, notably in fastness to bleach treatments (including e.g. the AATCC 4 washing test) and to alkali treatments. Furthermore, mixtures with phthalocyanine dyes, commonly used to obtain bright green shades, have unsatisfactory light fastness in moist weakly alkaline conditions. This effect is known in the art as "catalytic wetfading."

As compared with known pyrazolone dyes of the above-mentioned specifications, the new dyestuffs are stronger tinctorially have better fastness to bleach treatments and to alkali treatments and exhibit a lower degree of catalytic wet fading in mixtures with phthalocyanine dyes.

The concept of use of hydroxypyridones to manufacture azo dyes is not new; for example, U.S. Pat. No. 2,431,190 discloses the use of certain 4-hydroxypyridones as couplers in the manufacture of diazotype prints. However this kind of coupling component is quite useless for the manufacture of cellulose-reactive dyes since it has been found that the 4-hydroxypyridone ring is unstable to alkali and decomposes under the conditions typical for dyeing or printing with cellulose-reactive dyes. More recently U.S. Pat. No. 3,487,066 discloses that disperse dyes obtained from 2,6-dihydroxy-3-cyano-4-methylpyridine and certain benzenoid diazo components free from $SO_3H$ or $CO_2H$ groups provide reddish-yellow or greenish-yellow dyeings on polyester fibres. The new dyes differ in the use of a sulphonated naphthylamine as diazo component, the use of pyridone coupling components which are differently substituted in the 1 and 3 positions; the fact that the dyes of U.S. Pat. No. 3,487,066 are water-insoluble and cannot dye cellulose and the new dyes are water-soluble and cannot dye polyester; their general structure is quite different to any disazo dyestuff described in U.S. Pat. No. 3,487,066; finally reactive dyes based on the coupling component of U.S. Pat. No. 3,487,066 and disulphonated naphthylamines are similar to pyrazolone dyes in their poor fastness to bleach and alkali treatments.

THE INVENTION

According to the present invention there are provided disazo dyestuffs of the formula:

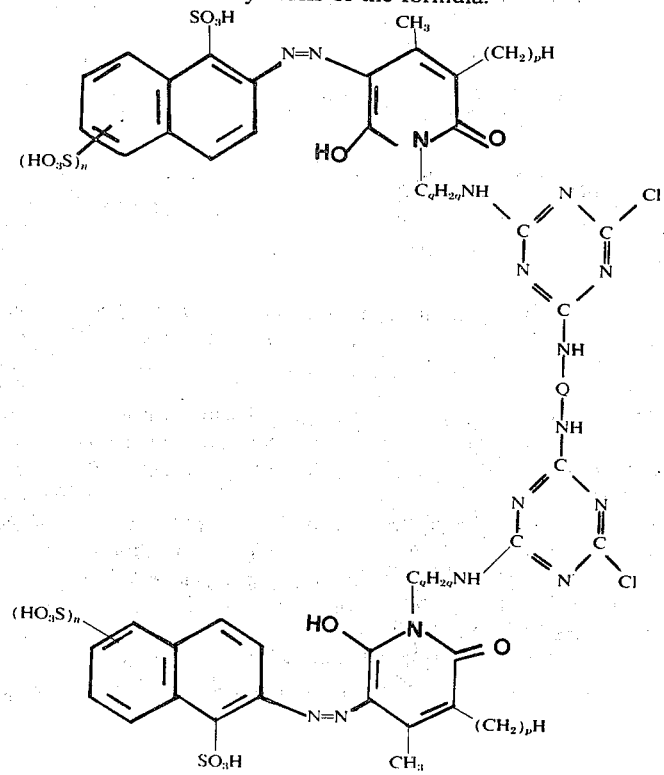

wherein
n is 0, 1 or 2
p is 0, 1 or 2
q is 2 or 3 and
Q is a member of the group consisting of 4,6-disulpho-1,3-phenylene, 2,5-disulpho-1,4-phenylene, $$\text{(2)} \quad \underset{\text{SO}_3\text{H}}{\bigcirc}-\text{NHCONH}-\underset{\text{HO}_3\text{S}}{\bigcirc} \quad \text{and} \quad \text{(3)} \quad \underset{\text{SO}_3\text{H}}{\bigcirc}-Q'-\underset{\text{HO}_3\text{S}}{\bigcirc}$$

in which $Q^1$ is a direct link or —CH=CH—, —NH—CONH—, —S—, —OCH$_2$CH$_2$O—, —CH$_2$—, or —CH$_2$CH$_2$—.

The preferred dyes, in general, are those in which n is 1, this SO$_3$H group being in the 5 or 6 position of the naphthalene ring, p is 1 or 2 and q is 2 or 3 so that C$_q$H$_{2q}$ is ethylene.

The improvement in bleach fastness obtained by use of Tobias acid type diazo components is most surprising since this effect is not found in comparable dyes containing a pyrazolone residue, or the 3-cyano-4-methyl-2,6-dihydroxypyridine nucleus.

The new dyestuffs can be obtained by the conventional coupling and condensation reactions starting from 2 moles of a diazo component of the formula:

(4) 2-naphthylamine with SO$_3$H, NH$_2$, and (HO$_3$S)$_n$ substituents and a coupling component of the formula:

(5) pyridone with CH$_3$, (CH$_2$)$_p$H, HO, and C$_q$H$_{2q}$NH$_2$ substituents 2 moles of cyanuric chloride and 1 mole of a diamine of formula $$\text{NH}_2 - Q - \text{NH}_2 \qquad (6)$$

In general, the coupling step can be effected before or after all the condensation steps have been carried out or, if desired, may be carried out between the condensation steps.

Diazotization of the amine of formula (4) can be carried out in the normal way, e.g. by adding an alkali metal nitrite to a solution of the amine in aqueous hydrochloric acid and allowing reaction to take place at a temperature from 0°C to about 20°C.

The coupling step can be carried out in a weakly alkaline, neutral or acid, even strongly acid, solution; it is preferably carried out at a pH of from 5 to 8, e.g. in the presence of acetic acid or a mixture of acetic acid and sodium acetate to maintain the pH in this range.

The condensation steps may be carried out in an aqueous medium, advantageously in the presence of a dispersing agent or a water-soluble organic liquid such as acetone, when cyanuric chloride is one of the reactants. Hydrochloric acid is formed during the course of the reaction and is preferably neutralized by maintaining the reaction mixture at a pH of 6–8 by adding an acid-binding agent, e.g. sodium hydroxide or sodium carbonate at a suitable rate. A higher pH may be used if this is necessary to dissolve the amino compound being reacted. Condensations involving cyanuric chloride are most expediently carried out at from 0° to about 20°C and those involving dichloro-s-triazine compounds at from about 30°C to about 50°C. These temperature ranges are not critical but operation at lower temperatures will extend the reaction time and at higher temperatures will increase the possibility of unwanted side-reactions taking place.

As examples of diazo components of formula (4) which may be used, there may be mentioned:
Tobias Acid (2-naphthylamine-1-sulphonic acid)
2-naphthylamine-1,5-disulphonic acid
2-naphthylamine-1,6-disulphonic acid
2-naphthylamine-1,5,7-trisulphonic acid As coupling components of formula (5) which may be used, there may be mentioned:

| | |
|---|---|
| 1-β-aminoethyl | |
| 1-β-aminopropyl | -4-methyl-6-hydroxypyrid-2-one |
| 1-γ-aminopropyl | |
| 1-β-aminoethyl | |
| 1-β-aminopropyl | -3,4-dimethyl-6-hydroxypyrid-2-one |
| 1-γ-aminopropyl | |
| 1-β-aminoethyl | |
| 1-β-aminopropyl | -3-ethyl-4-methyl-6-hydroxypyrid-2-one |
| 1-γ-aminopropyl | |

As amines of formula (6) which may be used, there may be mentioned:
1,3-phenylenediamine-4,6-disulphonic acid
1,4-phenylenediamine-2,5-disulphonic acid
4,4'-diaminostilbene-2,2'-disulphonic acid
benzidine-2,2'-disulphonic acid
4,4'-diaminodiphenylurea-2,2'-disulphonic acid
5,5'-diaminodiphenylurea-2,2'-disulphonic acid
4,4'-diaminodiphenylsulphide-2,2'-disulphonic acid
4,4'-diaminodiphenoxyethane-2,2'-disulphonic acid
4,4'diaminodiphenylethane-2,2'-disulphonic acid
4,4'-diaminodiphenylmethane-2,2'-disulphonic acid The new dyestuffs can be isolated from the reaction mixtures in which they have been formed by the usual techniques adopted for isolation of water-soluble reactive dyestuffs, for example, by salting out and filtration, or by spray-drying the reaction mixture in which the dyestuff has been formed.

The new reactive dyestuffs are valuable for coloring cellulose textile materials, e.g. textile materials comprising natural or regenerated cellulose such as cotton, linen and viscose rayon. For coloring such materials, the new dyestuffs are preferably applied, either by a printing or a dyeing process to the cellulose textile material in conjunction with a treatment with an acid binding agent, e.g. caustic soda, sodium carbonate, silicate or bicarbonate, which may be applied to the material before, during or after the application of the dyestuff. When so applied the new dyestuffs react with the cellulose and yield greenish-yellow shades having the properties stated earlier. The new dyestuffs are especially valuable for dyeing from hot, saline, alkaline dyebaths under which conditions a high level of fixation is achieved.

The invention is illustrated but not limited by the following examples in which parts are by weight.

EXAMPLE 1

3.03 Parts of 2-naphthylamine-1,5-disulphonic acid are dissolved in 150 parts of water by addition of caustic liquor (70°Tw). 0.69 part of sodium nitrite is added and the solution is stirred vigorously at 0°–5° whilst 8 parts of hydrochloric acid (36°Tw) are added. The mixture is stirred at 0°–5° for 1 hour and the excess of nitrous acid destroyed by the addition of sulphamic acid.

This solution is added to a solution of 1.68 parts of 1-$\beta$-aminoethyl-4-methyl-6-hydroxypyrid-2-one in 100 parts of water at 10°C and the mixture is stirred for 1 hour at 5°–10°. The yellow precipitate is collected by filtration and dissolved in 200 parts of water by addition of caustic liquor (70°Tw), the final solution having pH 12–14. The solution is cooled to 0°–5° and added during 20 minutes to a stirred suspension of 2.5 parts of cyanuric chloride in 15 parts of acetone, 50 parts of ice, 50 parts of water and one part of dispersing agent, the pH being maintained at 9–10 during the addition by means of occasional addition of 2N hydrochloric acid as necessary. The solution is stirred for a further 30 minutes at pH 8–9 and filtered, then the pH is adjusted to 7 by addition of aqueous hydrochloric acid and a solution of 1.56 parts of disodium, 1,4-phenylenediamine-2,5-disulphonate in 30 parts of water is added.

The mixture is heated to 35°C and stirred at 35°–40°C for 5 hours, keeping the pH at 6–7 by additions of aqueous sodium carbonate solution. The dyestuff obtained is precipitated by salting and is filtered off and dried. It dyes cotton and viscose rayon in bright greenish-yellow shades of good fastness to light, washing, bleach, acid and alkali.

EXAMPLE 2

A mixture of 42.4 parts of disodium 4,4'-diaminostilbene-2,2'-disulphonic acid and 37 parts of cyanuric chloride in 1,000 parts of water are stirred for 2 hours at 0°–5°C, keeping the pH at 6–7 by adding sodium carbonate solution.

A solution of 36.4 parts of 1-$\beta$-aminoethyl-3,4dimethyl-6-hydroxypyrid-2-one in 500 parts of water is added and the mixture is heated to 35°C and stirred at 35°–40°C for 4 hours, keeping the pH at 6–7 by adding sodium carbonate solution.

The mixture is cooled to 5°C, then a solution of the diazonium salt from 44.6 parts of 2-naphthylamine-1-sulphonic acid (obtained in similar manner to Example 1) is added and the mixture is stirred at 0°–5°C, pH 6–7 for 2 hours.

The dyestuff is isolated by salting, filtration and drying in the usual way. It dyes cotton and viscose rayon from hot alkaline saline dyebaths in bright greenish yellow shades of good fastness to washing, light, bleaching, acid and alkali.

The following table describes further examples of the invention which may be obtained in similar manner to Example 1 or 2 either by diazotizing the amine of column II and coupling with the pyridone of column III and reacting cyanuric chloride with 1 mole of the resulting azo compound and one-half mole of the diamine named in column IV, or by reacting cyanuric chloride with 1 mole of the pyridone and one-half mole of the diamine and coupling with the diazotized amine.

| Example | | 1-Z-3-R-4-methyl-6-hydroxypyrid-2-one | | |
|---|---|---|---|---|
| | | Z | R | |
| 3 | 2-naphthylamine-1,5-disulphonic acid | $CH_2CH_2NH_2$ | H | benzidine-4,4'-disulphonic acid |
| 4 | " | " | " | 4,4'-diaminodiphenoxyethane-2,2'-disulphonic acid |
| 5 | " | " | $CH_3$ | 4,4'-diaminodiphenylurea-2,2'-disulphonic acid |
| 6 | " | " | " | 4,4'-diaminostilbene-2,2'-disulphonic acid |
| 7 | " | $CH_2CH(NH_2)CH_3$ | " | 4,4'-diaminodiphenylethane-2,2'-disulphonic acid |
| 8 | 2-naphthylamine-1-sulphonic acid | $CH_2CH_2NH_2$ | " | 1,4-phenylenediamine-2,5-disulphonic acid |
| 9 | " | " | " | benzidine-2,2'-disulphonic acid |
| 10 | " | " | H | 4,4'-diaminodiphenoxyethane-2,2'-disulphonic acid |
| 11 | " | " | " | 4,4'-diaminodiphenylurea-2,2'-disulphonic acid |
| 12 | " | $CH_2CH_2CH_2NH_2$ | " | 4,4'-diaminodiphenylmethane-2,2'-disulphonic acid |
| 13 | 2-naphthylamine-1,6-disulphonic acid | " | $CH_3$ | 5,5'-diaminodiphenylurea-2,2'-disulphonic acid |
| 14 | " | $CH_2CH(NH_2)CH_3$ | H | 4,4'-diaminodiphenylsulphide-2,2'-disulphonic acid |
| 15 | " | " | " | 4,4'-diaminodiphenylurea-2,2'-disulphonic acid |
| 16 | 2-naphthylamine-1,6-disulphonic acid | $CH_2CH_2NH_2$ | H | benzidine-2,2'-disulphonic acid |
| 17 | " | " | " | 4,4'-diaminidiphenoxyethane-2,2'-disulphonic acid |
| 18 | 2-naphthylamine-1,5,7-trisulphonic acid | " | $CH_3$ | 1,3-phenylenediamine-4,6-disulphonic acid |
| 19 | " | " | " | 5,5'-diaminodiphenylurea-2,2'-disulphonic acid |
| 20 | " | " | " | benzidine-2,2'-disulphonic acid |
| 21 | " | $CH_2CH(NH_2)CH_3$ | $C_2H_5$ | " |
| 22 | " | $CH_2CH_2NH_2$ | " | 1,4-phenylenediamine-2,5-disulphonic acid |
| 23 | " | $CH_2CH_2CH_2NH_2$ | " | 1,3-phenylenediamine-4,6-disulphonic acid |

I claim:
1. A disazo dyestuff of the formula:

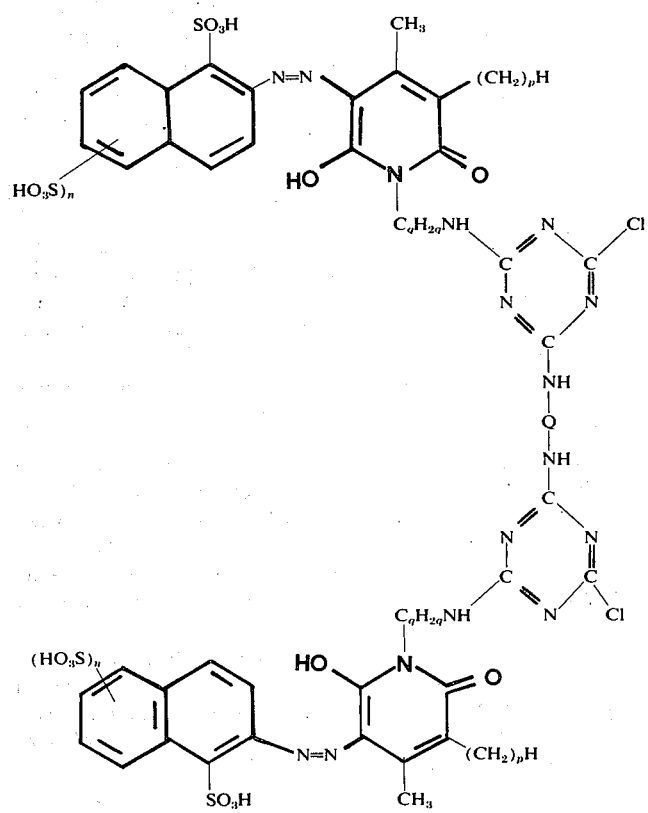

wherein
n is 0, 1 or 2
p is 0, 1 or 2
q is 2 or 3 and
Q is a member of the group consisting of 4,6-disulpho-1,3-phenylene, 2,5-disulpho-1,4-phenylene,

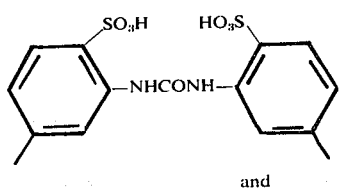

and

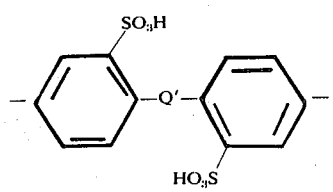

in which $Q^1$ is a direct link or —CH=CH—, —NH—CONH—, —S—, —OCH$_2$CH$_2$O—, —CH$_2$— or —CH$_2$CH$_2$—.

2. A disazo dyestuff as claimed in claim 1 wherein n is 1, this SO$_3$H group being in the 5- or 6-position of the naphthalene ring, p is 1 or 2 and q is 2.

3. A disazo dyestuff as claimed in claim 2, having the formula A — Tr— Dm — Tr — A wherein A is

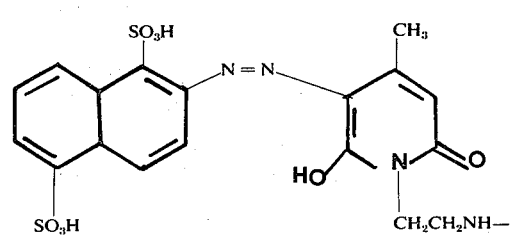

Tr is

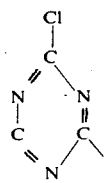

and Dm is

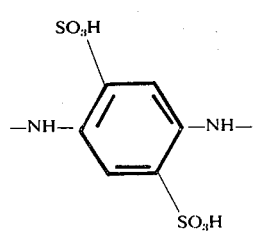

4. A disazo dyestuff as claimed in claim 2 having the formula A — Tr — Dm — Tr — A wherein A is

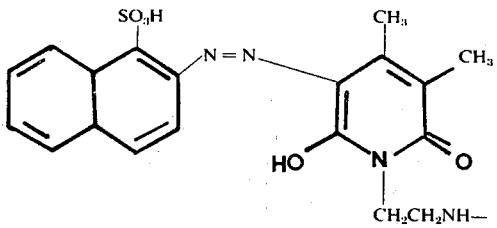
Tr is
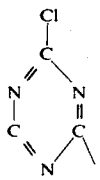
and Dm is
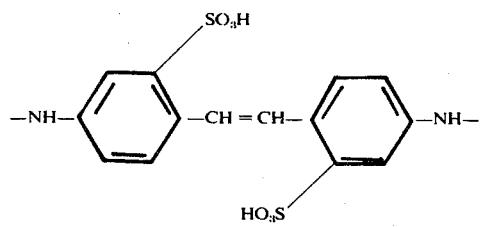
5. A disazo dyestuff as claimed in claim 2 having the formula A — Tr — Dm — Tr — A wherein
A is
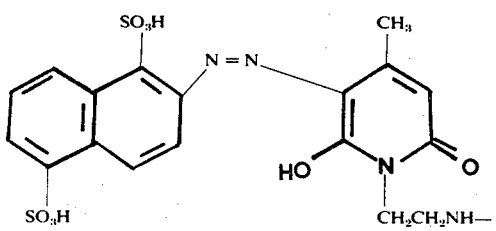
Tr is
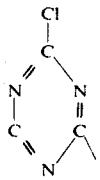
and Dm is
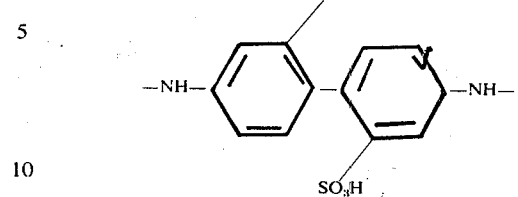
6. A disazo dyestuff as claimed in claim 2 having the formula A — Tr — Dm — Tr — A wherein
A is
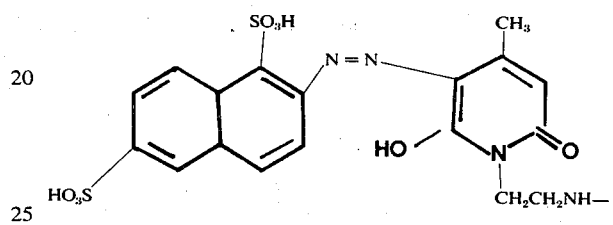
Tr is
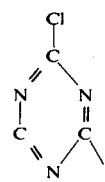
and Dm is
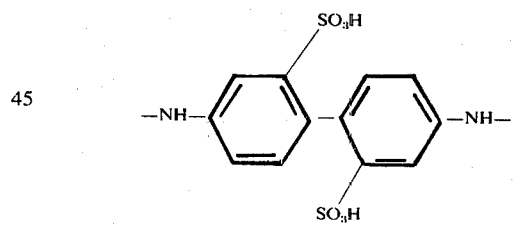
* * * * *

UNITED STATES PATENT OFFICE
CERTIFICATE OF CORRECTION

Patent No. 3,905,950              Dated September 16, 1975

Inventor(s) Allen Crabtree              Page 1 of 2

It is certified that error appears in the above-identified patent and that said Letters Patent are hereby corrected as shown below:

In the Heading

Under [63] Related U. S. Application Data, line 3, change "Sept. 22, 1968" to --Sept. 22, 1969--.

Column 1, line 7, change "Sept. 22, 1968" to --Sept. 22, 1969--.

line 9, change "disazp" to --disazo--.

Column 8, between lines 45 and 55, the structural formula should read

--    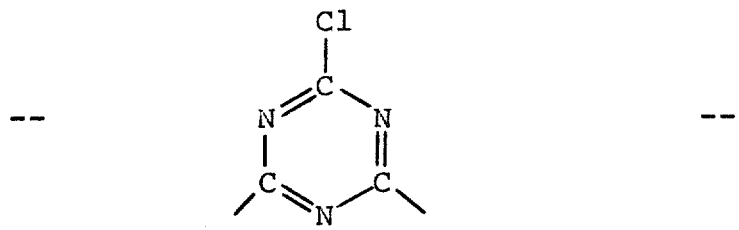    --

UNITED STATES PATENT OFFICE
CERTIFICATE OF CORRECTION

Patent No. 3,905,950   Dated September 16, 1975

Inventor(s) Allen Crabtree   Page 2 of 2

It is certified that error appears in the above-identified patent and that said Letters Patent are hereby corrected as shown below:

Column 9, between lines 10 and 20, the structural formula should read

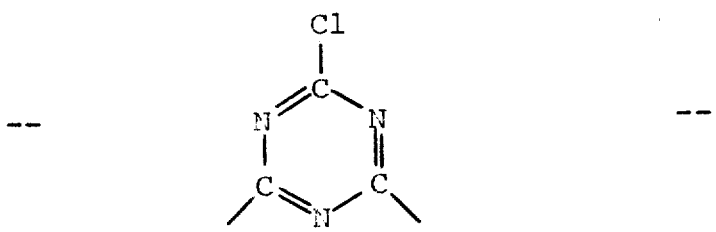

Column 9, between lines 45 and 55, the structural formula should read

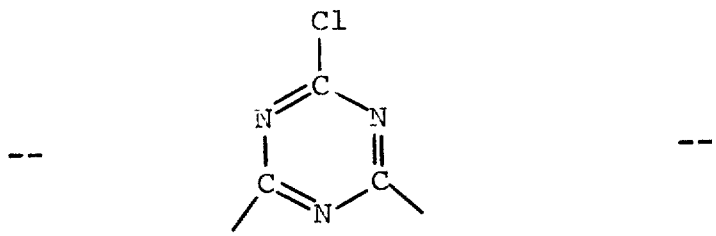

Column 10, between lines 30 and 40, the structural formula should read

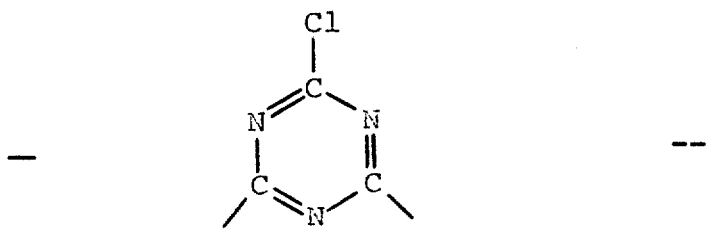

Signed and Sealed this twenty-seventh Day of April 1976

[SEAL]

Attest:

RUTH C. MASON
Attesting Officer

C. MARSHALL DANN
Commissioner of Patents and Trademarks